6829X
O. Allen,
Rotary Steam Engine.
Patented Nov. 8, 1831.
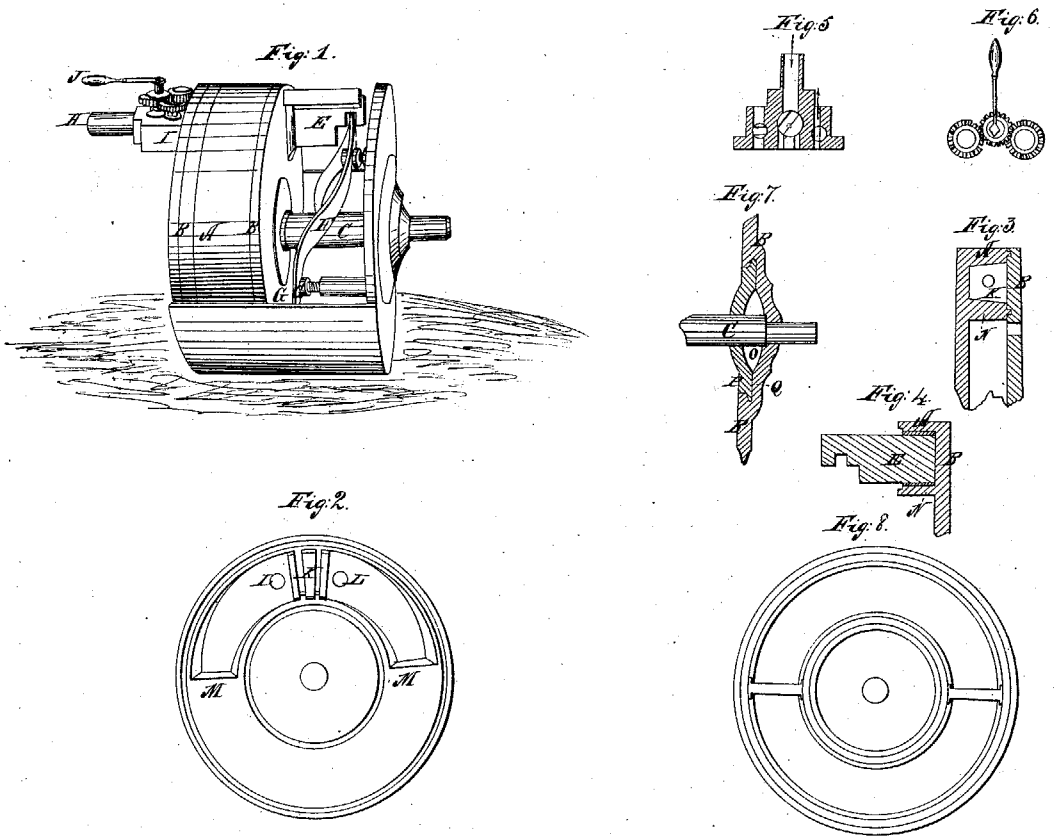
AM. PHOTO-LITHO. CO. N.Y. (OSBORNE'S PROCESS)

Oliver Allen, Norwich, Connecticut

Letters Patent.

The Schedule referred to in these Letters Patent, and forming part of the same, containing a description in the words of the said Oliver Allen, himself, of his Improvement in Machinery which may be used either as a rotary Steam Engine or as a pump for raising Water.

To all whom it may concern. Be it known, That I, Oliver Allen of the City of Norwich, in the State of Connecticut, have invented Improvements in certain Machinery which may be used either as a rotary Steam Engine, or as a pump for raising water, and, That the following is a full and exact description thereof, reference being had to the drawings which accompany this Specification. The general structure of my rotary Engine or pump does not differ from certain other Machines which have been constructed for the same purposes; but the Improvements introduced by me are intended to obviate the difficulties which have heretofore interfered with the useful operation of such Machines. Fig. 1. in the accompanying Drawing is a perspective view of the Engine, the upper half of the casing in which I usually enclose it being removed to show such parts as are thus brought into view. The same letters of reference are used in all the figures to designate the same parts of the Machine. A is the outer rim of the cylindrical Steam case which is made to revolve on a fixed or stationary head B, carrying with it the main shaft or axle C. The head D, is usually cast in one piece with the rim A. Through this head two valves are made to slide so as to occupy the chamber of the cylindrical Steam case which chamber is the cavity between the two heads B & D the outer rim A, and an inner one which will be shown in section. One of these valves is shown at E, the other is diametrically opposite to it. F is a circular guide piece intended to open and close the valves. As the valves are intended to be kept closed during a little more than one half their revolution the lower part of the guide

[illegible]